United States Patent [19]
Webster, Jr. et al.

[11] Patent Number: 4,885,679
[45] Date of Patent: Dec. 5, 1989

[54] SECURE COMMODITY BUS

[75] Inventors: Raymond J. Webster, Jr., Groveland; Joseph G. DiChiara, Burlington, both of Mass.

[73] Assignee: BULL HN Information Systems Inc., Billerica, Mass.

[21] Appl. No.: 136,079

[22] Filed: Dec. 21, 1987

[51] Int. Cl.$^4$ .............................................. G06F 13/00
[52] U.S. Cl. .................................. 364/200; 364/238.4
[58] Field of Search ... 364/200 MS File, 900 MS File

[56] References Cited
U.S. PATENT DOCUMENTS
4,707,803 11/1987 Anthony, Jr. et al. ............. 364/900

Primary Examiner—Emanuel S. Kemeny
Assistant Examiner—Michael A. Jaffe
Attorney, Agent, or Firm—George Grayson; John S. Solakian

[57] ABSTRACT

A secure system includes a secure central processor unit, an input/output emulator, a number of commodity controller boards and a number of commodity memory boards. Apparatus in the secure CPU and firmware in the I/O emulator maintain the security of the overall system.

6 Claims, 4 Drawing Sheets

DISK READ OPERATION

SECURE COMMODITY BUS

BACKGROUND OF THE INVENTION

1. Scope of the Invention

This invention relates principally to the field of secure computers, and more particularly to apparatus for assuring that commodity controllers do not communicate directly with a secure memory.

2. Description of the Prior Art

Many personal computers are made up of commercially available commodity boards. These boards include a base processor board, memory commodity boards and controller commodity boards, all coupled together by a common bus. The common bus includes address lines and data lines. Any commodity board may write into and read from the memory in competition with each other. This presented problems since under some conditions, mostly malfunctioning conditions, data would be lost due to overwriting.

To prevent this condition, an I/0 processor was placed between the commodity controller and commodity memory. This alleviated the problem somewhat, however since the commodity controller could bypass the I/0 processor and write into or read from memory directly, the management of memory became difficult. This presents particular problems when a secure computer operates with commercially available commodity controller boards and commodity memory boards.

OBJECTS OF THE INVENTION

Accordingly it is an object of the invention to have an improved secure computer made up of commercially available commodity boards, but having a secure memory.

It is another object of the invention to have a secure computer using commercially available commodity boards, thereby reducing the cost of the system.

SUMMARY OF THE INVENTION

The secure computer system includes a base secure CPU board, a number of memory commodity boards, a number of commodity controllers with their respective devices and an input/output emulator board. The commodity controllers communicate with the I/0 emulator which in turn communicates with commodity memory. Similarly commodity memory communicates with the I/0 emulator which in turn communicates with the commodity controller.

The CPU board initiates a data transfer to memory by sending a first read command to the I/0 emulator. The I/0 emulator in turn sends a second read command to the commodity controller. The commodity controller fetches the data from a specified device and sends it to the I/0 emulator where it is stored in the I/0 emulator's random access memory (RAM). When RAM has stored the entire response to the first command, the I/0 emulator sends a write command which include a channel number of an address register counter, an indication of a read operation and a commodity memory address location. In addition the I/0 emulator generates a data enable signal.

The channel number is decoded to generate an address enable signal. The address register counter is responsive to the address enable signal for storing the starting address of the commodity memory into which the first data word is stored. The transceivers that couple the I/0 emulator to the commodity memory are enabled by the data enable signal and a R/W signal to transfer the data from the I/0 emulator RAM to the commodity address. The address register counter is incremented each I/0 cycle so that the data is written into successive commodity memory locations.

For the read from memory operation, the I/0 emulator sends a read command to the CPU board. The read command includes the channel number of the address register counter and a read indication, as well as the starting commodity address. Again the channel number is decoded to generate the address enable signal and the R/W signal is generated and applied to the XCVRS to conduct in the opposite direction to the above write operation. Again the data enable signal enables the XCVRS for the transfer of data from the specified commodity memory location to the I/0 emulator RAM.

The address register counter is incremented for each I/0 cycle and the stream of data words is sent to the I/0 emulator RAM.

In both the read and write operations, the DMA logic in the I/0 emulator generates the RAM address.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
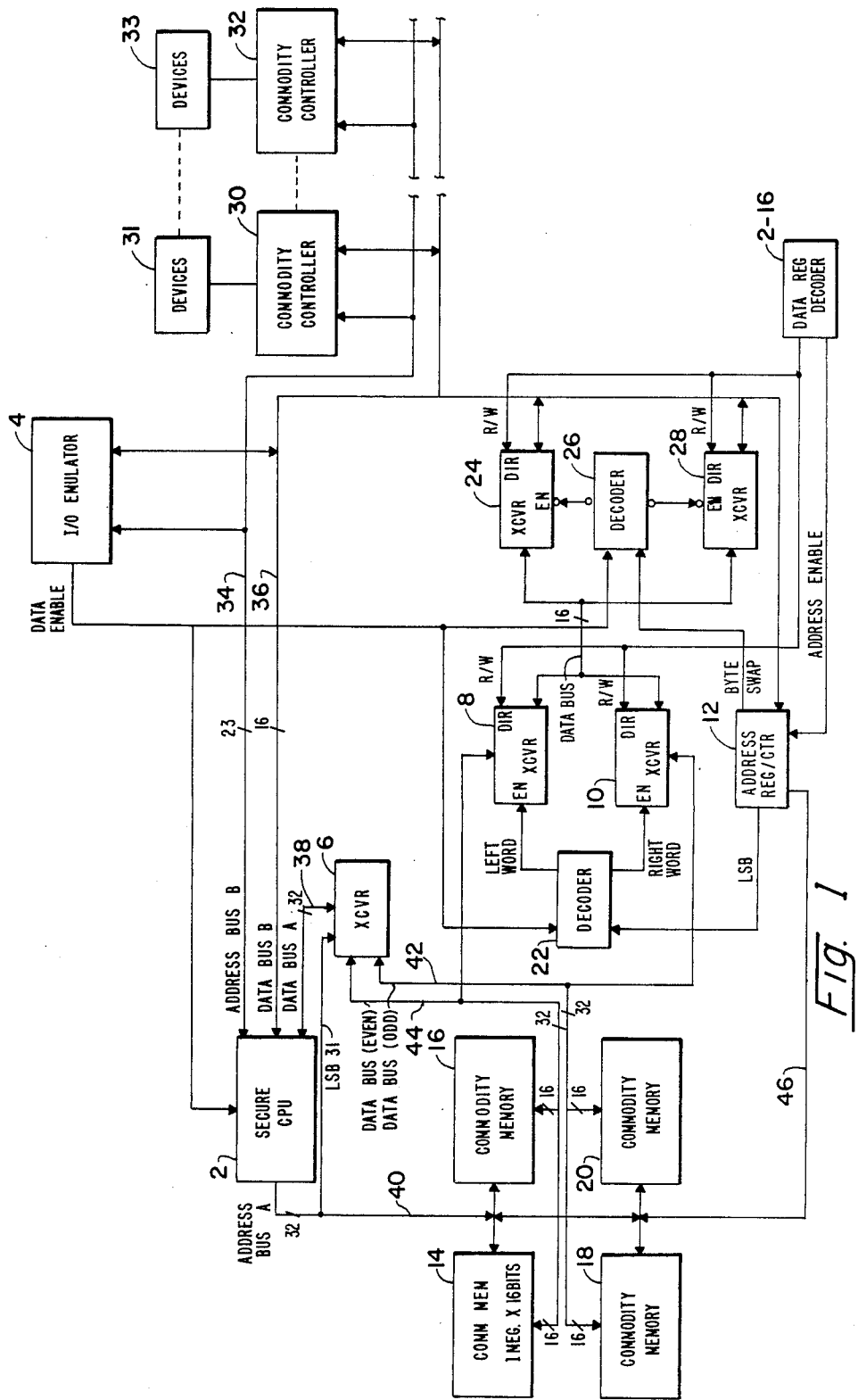
FIG. 1 shows a block diagram of the overall secure system.

FIG. 1 shows an overall block diagram of the Secure Workstation System 1. System, or data processing system, 1 includes a secure central processor unit (CPU) 2, a number of commodity memory boards 14, 16, 18 and 20, system memory data storage devices, an I/0 emulator board 4, and a number of commodity controller boards 30 through 32. Commodity boards are typically printed circuit logic boards which are commercially available and may be ordered through advertisements in computer trade newspapers and magazines.

This invention allows the secure CPU 2 to operate with the commodity memories 14 through 20 and the commodity controllers 30 through 32 and to maintain the security of the overall system 1. The secure operating system running on CPU 2 and the special hardware and firmware of the CPU 2 and the I/0 Emulator 4 are not a part of the invention and therefore not described further.

CPU 2 communicates with memories 14, 16, 18 and 20 via a unidirectional 32 bit address bus 40, and bidirectional, 32 bit data busses 38, 42 and 44 collectively, the memory bus of system. Since this typical embodiment includes 1 megabyte by 16 bit memory boards and System 1 requires 32 bit words, memories 14 and 16 store 32 bit words in even address locations and memories 18 and 20 store 32 bit words in odd address locations. The least significant bit signal (LSB) 31 applied to a transceiver (XCVR) 6 selects either the even data bus 44 or the odd data bus 42.

Peripheral devices 31 through 33 are coupled to commodity peripheral controllers 30 through 32 respectively. Devices 31 through 33 may include any number of peripheral devices that are compatible with their respective controllers. Typical devices include personal computers, mass storage, unit record equipment, printers and the like.

The controllers 30 through 32 communicate with the I/O emulator 4 or CPU 2 in either a byte, word or batch mode via a 23 bit address bus 34 and a bidirectional 16 bit data bus 36. Address bus 34 and data bus 36 constitute the I/O bus of system 1.

The controllers 30 through 32 do not communicate with memories 14 through 20 directly but rather through the I/O emulator 4. As an example, data in byte, word or batch mode is transferred from device 33 for storage in I/O emulator 4 via commodity controller 32 and data bus 36. The I/O emulator 4, on each bus cycle, will generate a data enable (DEN) signal which is applied to a decoder 26 and the secure memory is addressed which generates a signal to enable a transceiver (XCVR) 24. The I/O emulator 4 then transfers the data to memories 14 and 16 via a XCVR 24, a XCVR 8 and data bus 44, or to memories 18 and 20 via XCVR 24, a XCVR 10 and data bus 42.

Since none of the commodity controllers 30 through 32 can generate the Data Enable signal, they cannot communicate directly with memories 14 through 20.

Address information is sent by controller 32 to I/O emulator 4. I/O emulator 4 loads the address information into a register counter 12 for the data transfer between memories 14 through 20 and I/O emulator 4. If the least significant bit (LSB) signal indicates an even address which is applied to decoder 22, then XCVR 8 is enabled to send the 16 data bits from XCVR 24 to the even data bus 44 for storage on memory 14. Similarly if signal LSB indicates an odd address, the XCVR 10 is enabled and the 16 data bits are stored in memory 20.

Figure 2:
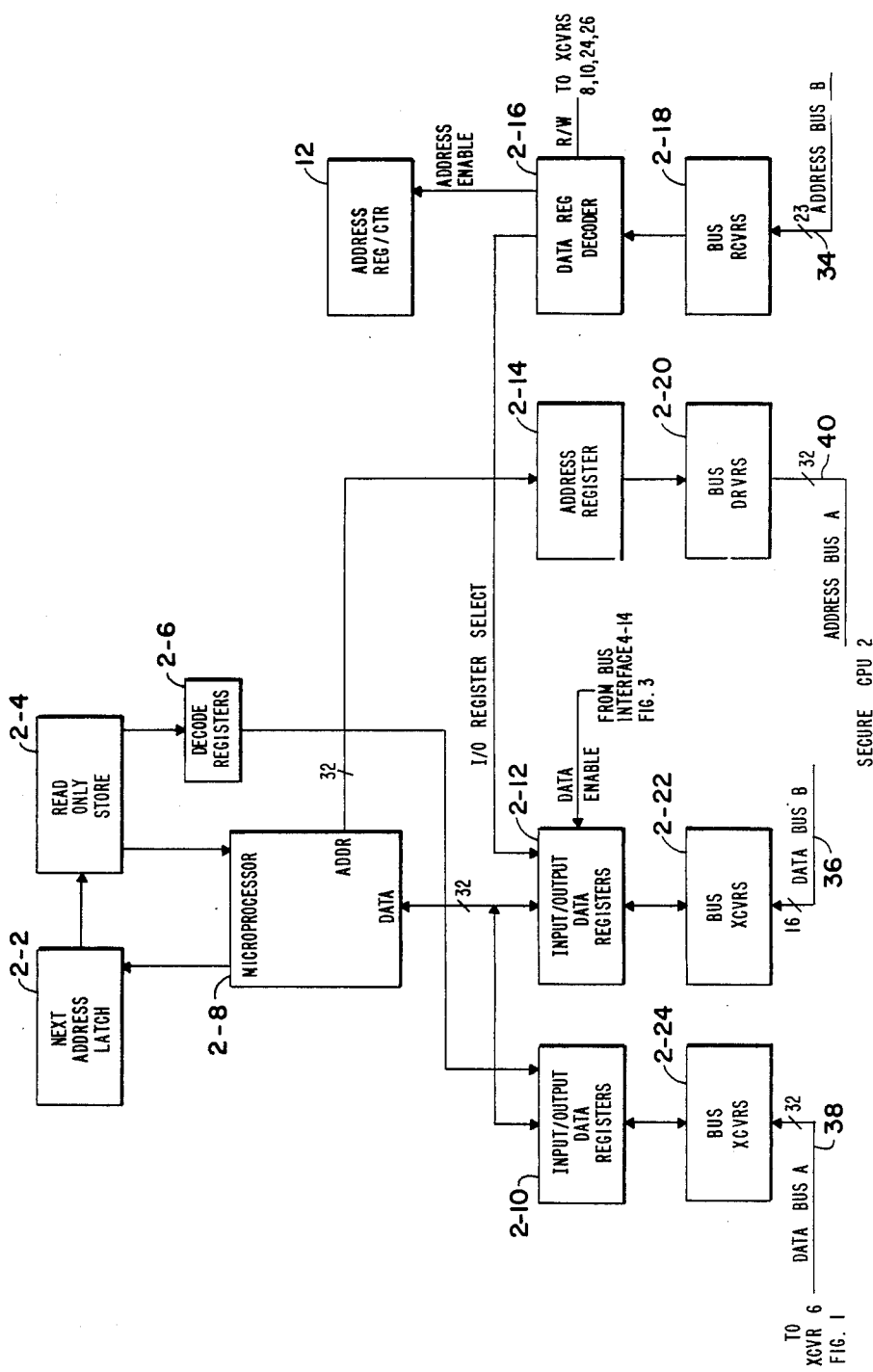
FIG. 2 shows a block diagram of the secure central processing unit.

Referring to FIG. 2, the secure CPU 2 operates in a conventional manner. Operating System and Application Programs as well as operands are stored in memories 14 through 20. A next address latch 2-2 addresses a read only store (ROS) 2-4 which applies microword signals to a microprocessor 2-8 and decode registers 2-6 in a conventional manner. Microprocessor 2-8 generates address signals which are applied to memories 14 through 20 via an address register 2-14, bus drivers 2-20 and address bus A 40. Data is sent to or received from memories 14 through 20 via data bus A 38, bus XCVRS 2-24 and input/output data registers 2-10. If the information received by microprocessor 8 from data bus A 38 is an instruction, then it is executed by the microprocessor 2-8 sending signals to the next address latch 2-2, which in turn sends address signals to ROS 2-4. ROS 2-4 sends out microword signals to cause the CPU 2 to execute the instruction. The instruction may call for the microprocessor 2-8 to fetch operands from or write operands into memories 14 through 20 at an address sent over address bus A 40 and operands sent over data bus A 38.

The CPU 2 communicates with the I/0 emulator 4 via address bus B 34 and data bus B 36. The address signals from address bus B 34 are applied to a data register decoder 2-16 which generates an I/0 register select signal. The input/output data registers are responsive to the I/0 register select signal to receive data from or send data to the I/0 emulator 4 when enabled by the data enable signal from the I/0 emulator 4. The data enable signal is also applied to decoder 26, FIG. 1, to enable XCVR 24 to write data into or read data from memories 14 through 20. The I/0 emulator 4 sends a command which includes the channel number of the address register/counter 12 when the I/0 emulator wants to communicate with memories 14 through 20. The channel number is decoded by the data register decoder 2-16 to generate the ADDRESS ENABLE signal. The address register/counter 12 is responsive to the ADDRESS ENABLE signal for storing the starting address of memories 14 through 20 which it receives from the data bus B 36. The memory-I/0 emulator command includes the channel number in the portion of the command received over the address bus B 34 and the starting memory address in the portion of the command received over data bus B 36. Note that the byte swap transceiver 28 is also enabled by the data enable signal and in conjunction with the byte swap signal BYTE SWAP to swap the positions of the two 8 bit bytes within the word received from or written into memories 14 through 20.

Figure 3:
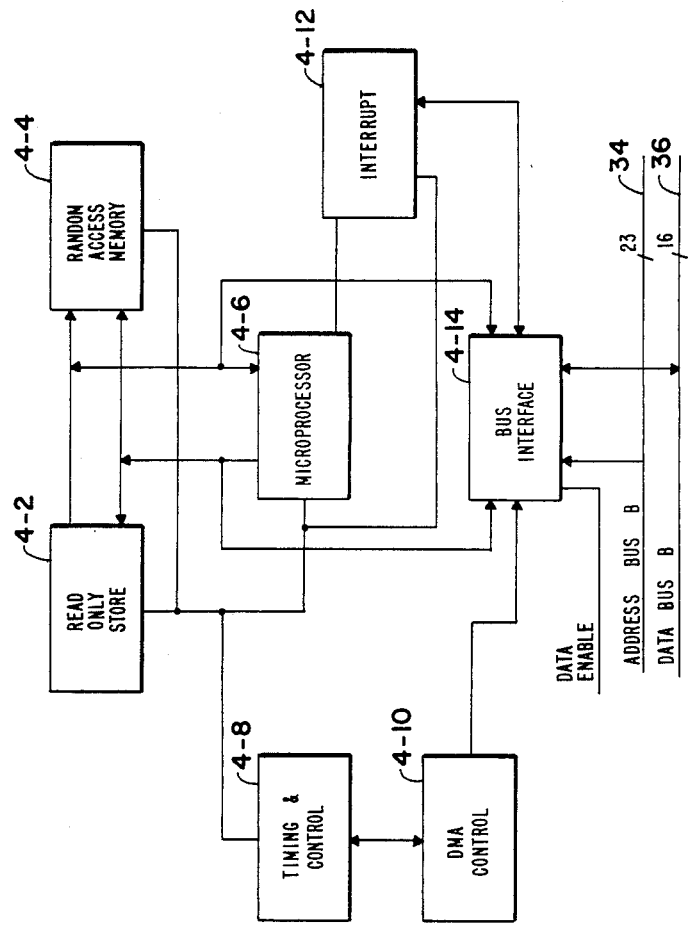
FIG. 3 shows a block diagram of the Input/Output emulator.

FIG. 3 is a block diagram of the I/0 emulator 4 which is located in a slot so as to be the first board to receive signals from or send signals to CPU 2 via address bus B 34 and data bus B 36. Commodity controllers 30 through 32 are in slot locations further down the busses 34 and 36 from the CPU 2 than is the I/0 emulator 4.

A read only store (ROS) 4-2 contains the firmware that has the security features built into the firmware. These security features assure that one of the commodity controllers 30 through 32 cannot communicate directly with memories 14 through 20 by controlling the information flow on busses 34 and 36. The firmware also controls the address locations of memories 14 through 20 into which the information from controllers 30 and 32 are loaded by storing a starting address in address register/counter 12.

Random Access Memory (RAM) 4-4 stores the data received from controllers 30 through 32 for subsequent transfer to memories 14 through 20; and for data received from memories 14 through 20 for subsequent transfer to controllers 30 through 32. RAM 4-4 is organized into areas, portions of which are used for control functions and other portions are used as data buffers. Each controller 30 through 32 has its dedicated data buffer. The RAM 4-2 structure is organized by the firmware in ROS 4-2.

Microprocessor 4-6 executes instructions from the ROS 4-2. This prevents the loading of a message in RAM 4-4 and executing the instructions in the message.

Interrupt 4-12 interrupts the microprocessor 4-6 based on interrupts from both the commodity controllers 30 through 32 and from the secure CPU 2. The interrupt 4-12 is conventional logic made up of commercially available interrupt logic circuits.

The direct memory access (DMA) control 4-10 is made up of a commercially available DMA chip and conventional logic. DMA control 4-10 is loaded solely by the microprocessor 4-6. None of the controllers 30 through 32 can gain access to the DMA control 4-10. That is, it is the DMA control 4-10 that indicates the locations of memories 14 through 20 that are involved in the data transfer and not the controllers 30 through 32 as is normally done.

A bus interface 4-14 is coupled to address bus A 34 and data bus B 36 for receiving and sending signals out on the busses. Each controller 30 through 32 has a similar bus interface. However, in addition, bus interface 4-14 generates a data enable signal every time the microprocessor 4-6 generates a request for the busses 34 and 36. The bus request logic is a conventional design and is not described further. The data enable signal is applied to decoders 22 and 26 to enable their respective XCVR's 8 and 10, and XCVR's 24 and 28. If the secure CPU 2 is also addressed by the I/0 emulator 4, then the XCVR's would be operative to pass information. If the CPU 2 is not addressed by the I/0 emulator 4, then the XCVR's would remain in a high impedance state and not pass information. When the I/0 emulator 4 is addressing the other controllers 30 through 32 for the transfer of information, then it is not able to address the CPU 2.

A timing and control 4-8 is the logic which coordinates and resolves contentions between the various logic elements of the I/0 emulator 4. This is a conventional operation.

Figure 4:
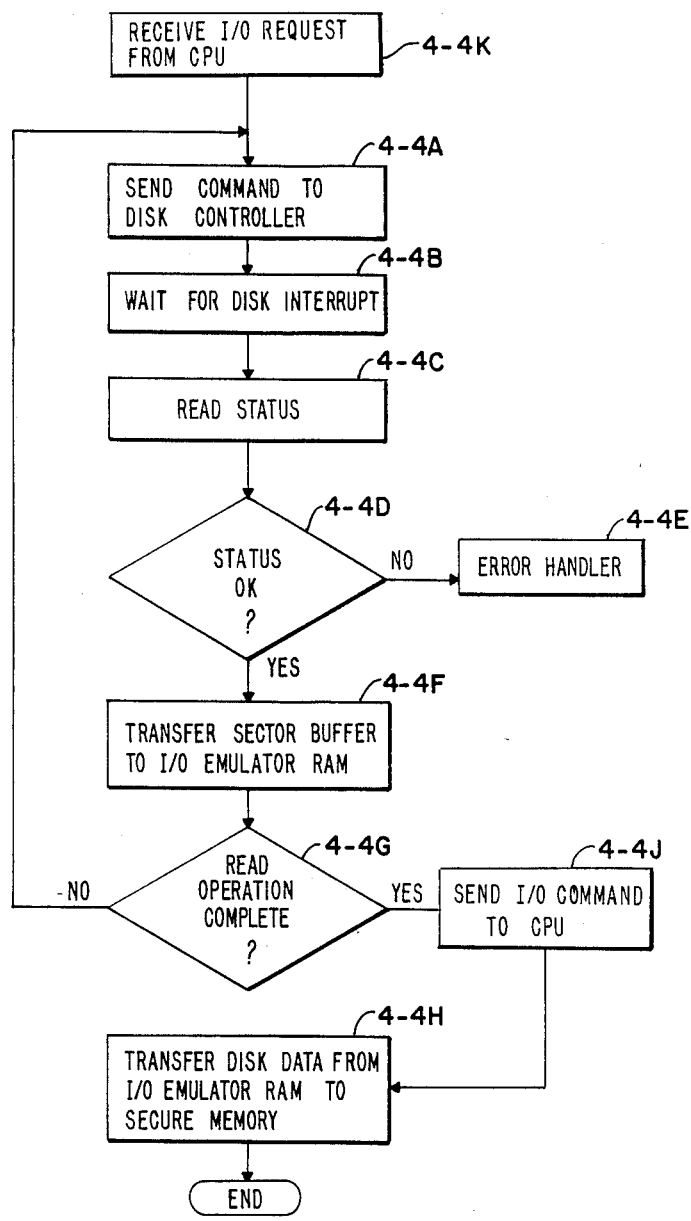
FIG. 4 shows a firmware block diagram of a typical commodity controller-I/0 emulator operation.

FIG. 4 shows a flowchart of a typical disk read from one of the devices 31 through 33 that is connected to busses 34 and 36 via the disk commodity controller 30 through 32. Note that the devices 31 through 33 and their commodity controllers 30 through 32 are shown symbolically. Controllers 30 through 32 represent any number and any kind of controller. Devices 31 through 33 represent any number of devices coupled to their respective controllers.

The secure CPU 2 may send an I/0 request command to the I/0 emulator 4 in block 4-4 K requesting a disk read. The command is conventional in nature and includes a disk identifier, a sector number, a cylinder number, a range and a starting memories 14 through 20 address. Microprocessor 4-6 is operative with ROS 4-2 to execute the following instruction sequence.

Block 4-4 A sends the disk I/0 read command to the designated disk controller. This information includes the disk channel number, the sector number, the head number and the range. Then in block 4-4 B, the I/0 emulator 4 waits for the disk interrupt which is received by interrupt 4-12 bus interface 4-14. This interrupt operation is conventional in nature. During this wait period the I/0 emulator 4 may perform other operations.

When the interrupt is received by the microprocessor 4-6 via the interrupt 4-12, a block 4-4 C the microprocessor sends a command to the disk controller to read the status of the disk controller and in decision block 4-4 D determines that the read was executed correctly or that there was a problem in finding the sector.

If the addressed sector was located and the sector information transferred to the sector buffer in the commodity disk controller, then block 4-4 F transfers the contents of the sector buffer of the commodity disk controller into a specified area of RAM 4-4 in a conventional manner. If the requested information was not found, then block 4-4 E initiates an error handler routine.

Decision block 4-4 G determines if the entire disk read operation is complete. If the operation requested by the CPU disk read command is not completed, then block 4-4 A sends the next command to the disk controller to read the next sector of requested information.

If decision block 4-4 G indicates that the operation is completed, then block 4-4 J sends an I/0 command to the CPU 2 and block 4-4 H transfers the data from the buffer area in RAM 4-4 to memories 14 through 20. This is accomplished by the I/0 emulator 4 generating the data enable signal and loading the address register/counter 12 with the address in memories 14 through 16 in which the first data word is stored. The address register/counter 12 may only be loaded when the I/0 emulator 4 specifies a predetermined address.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system comprising:
    a central unit (CPU);
    system memory data storage means for storing data;
    a memory bus, the CPU and system memory data storage means being connected to the memory bus, the CPU issuing read and write memory commands to the system memory data storage means to read data from and to write data into the system memory data storage means;
    peripheral controller means;
    peripheral data storage means for storing data connected to the peripheral controller means;
    I/O emulator means, the I/O emulator means including emulator data storage means for storing data;
    an I/O bus, the peripheral controller means, I/O emulator means and CPU being connected to the I/O bus;
    transceiver means connected to the I/O bus and the memory bus for transmitting data between the I/O bus and the memory bus when enabled by a data enable signal;
    said CPU initiating transfer of data between the system memory data storage means and the peripheral data storage means by issuing I/O read and write commands over the I/O bus to the I/O emulator, each such command identifying the data to be transferred, the data storage means in which said data is stored, and the data storage means to which it is to be transferred and stored; the I/O emulator in response to an I/O command received from the CPU, issuing emulator commands to transfer the data identified by the CPU's I/O command from the data storage means in which said data is stored to the emulator data storage means for storage therein; and for issuing emulator commands to transfer the data stored in the emulator data storage means to the data storage means specified by the I/O command into which said data is to be stored; said I/O emulator producing a data enable signal and applying the data enable signal to the transceiver means when data is transferred between the emulator data storage means and the system memory data storage means via the transceiver means.

2. The system of claim 1 in which said transceiver means further comprises: a data register decoder connected to the I/O bus for receiving emulator commands and for generating an address enable signal and a read/write signal when data is being transferred between the system memory data storage means and the emulator data storage means in response to an emulator command issued by the I/O emulator means.

3. The system of claim 2 in which said transceiver means further comprises: an address register counter means connected to the I/O bus and said data register decoder, and responsive to an address enable signal produced by the data register decoder for storing an initial address included in the emulator command transmitted over the I/O bus.

4. The system of claim 3 in which said transceiver means further comprises: a plurality of transceivers connected to the data register decoder, the I/O bus, and the I/O emulator means, and said transceivers responsive to a read/write signal produced by the data register decoder having a value denoting a read operation, transferring data from the system memory data storage means stored at an address stored in the address register counter means to the emulator data storage means.

5. The system of claim 4 in which the plurality of transceivers in response to the read/write signal applied thereto transfer data from the emulator data storage means to the system memory data storage means for storing at locations specified by the address signals stored in the address register counter.

6. The system of claim 5 in which the I/O emulator means further includes direct memory access control means for producing the addresses in the system memory data storage means into which data transferred from the emulator data storage means to the system memory data storage means are stored.

* * * * *